United States Patent
Noh (10) Patent No.: US 7,486,037 B2
(45) Date of Patent: Feb. 3, 2009

(54) CONTROL METHOD OF SENSORLESS BRUSHLESS DIRECT CURRENT MOTOR

(75) Inventor: Heung Gyun Noh, Gwangju (KR)

(73) Assignee: Samsung Gwangju Electronics Co., Ltd., Gwangju (KR)

(*) Notice: Subject to any disclaimer, the term of this patent is extended or adjusted under 35 U.S.C. 154(b) by 349 days.

(21) Appl. No.: 11/408,024

(22) Filed: Apr. 21, 2006

(65) Prior Publication Data
US 2007/0013330 A1   Jan. 18, 2007

(30) Foreign Application Priority Data
Jul. 13, 2005   (KR) .................... 10-2005-0063157

(51) Int. Cl.
*H02P 6/00*   (2006.01)
(52) U.S. Cl. .............. 318/400.01; 318/400.14; 318/459; 318/500; 318/432
(58) Field of Classification Search ............ 318/459, 318/500, 432, 632, 400.01, 400.14
See application file for complete search history.

(56) References Cited

U.S. PATENT DOCUMENTS 5,818,179 A * 10/1998 Kokami et al. ........ 318/400.04
6,380,707 B1 * 4/2002 Rosholm et al. ........ 318/400.03
2004/0251864 A1 * 12/2004 Cha ...................... 318/439

FOREIGN PATENT DOCUMENTS

| CN | 1574595 A | 2/2005 |
|---|---|---|
| JP | 11-187691 | 7/1999 |
| KR | 10-0308006 B1 | 8/2001 |

OTHER PUBLICATIONS

Translation of Japanese document JP 11-187691, pp. 1-9, May 20, 2008.*

* cited by examiner

*Primary Examiner*—Rina I Duda
(74) *Attorney, Agent, or Firm*—Blank Rome LLP

(57) ABSTRACT

Disclosed herein is a control method of a sensorless brushless direct current (BLDC) motor, and more particularly, a drive control method of a concentrated winding BLDC motor which prevents shutdown due to failures of detection of zero cross points (ZCPs). A reference voltage inputted to comparators is altered to set new reference points. ZCPs are detected using the new reference points to avoid uneven detection of the ZCPs. Phase commutation is corrected corresponding to the ZCPs detected using the new reference points to reduce current ripple, thereby leading to stable control of the sensorless BLDC motor. To this end, the control method adds or subtracts a preset certain value to/from a reference voltage to produce a new reference voltage, and detects ZCPs with respect to the new reference voltage to control drive of the sensorless concentrated winding BLDC motor.

12 Claims, 9 Drawing Sheets

CONTROL METHOD OF SENSORLESS BRUSHLESS DIRECT CURRENT MOTOR

CROSS-REFERENCE TO RELATED APPLICATION

This application claims the benefit of priority under 35 U.S.C. § 119(a) from Korean Patent Application No. 2005-63157, filed on Jul. 13, 2005 in the Korean Intellectual Property Office, the disclosure of which is incorporated herein by reference.

FIELD OF THE INVENTION

The present invention relates to a control method of a sensorless brushless direct current (BLDC) motor. More particularly, to a drive control method, which prevents shutdown of a concentrated winding BLDC motor due to failures in detection of zero cross points.

BACKGROUND OF THE INVENTION

In general, a direct current (DC) motor exhibits a linear relationship between applied voltage and speed. The linear relationship provides simplicity in speed control and a broad range for speed control. The DC motor includes a brush as a required element for maintaining unidirectional torque. Because of the brush, the DC motor has disadvantages such as poor suitability for high-speed operation, frequent maintenance due to abrasion of the brush, and excessive noise.

A brushless DC (BLDC) motor has been developed to overcome the disadvantages of the conventional DC motor. As opposed to the conventional DC motor, the BLDC motor comprises of a stator having a coil wound thereon and a rotator having a permanent magnet. A magnetic flux from the permanent magnet of the rotator interacts with a magnetic flux generated by a current flow in the coil of the stator. In the BLDC motor, the current flow in the coil of the stator is controlled such that the angle between the magnetic flux of the stator and the magnetic flux of the rotator is approximately 90° to provide a rotational force. Because a BLDC motor has no brush, it removes the above disadvantages of the conventional DC motor and retains advantages thereof. Thus, BLDC motors have been widely utilized in recent years.

To avoid using the brush, the BLDC motor uses inverter switching devices to maintain unidirectional torque. The inverter switching devices control where the magnetic flux of the stator is generated. To appropriately control magnetic flux, it is necessary to determine the rotator's position relative to the stator coils to properly coordinate the switching operations of inverter switching devices so that the angle between the magnetic flux of the stator and the magnetic flux of the rotator will be such that rotational force is developed. At this time, to detect the position of the rotator, a sensor such as a Hall sensor may be used to directly measure the rotator position. However, owing to environmental factors such as temperature and pressure, a sensorless approach is mainly used. The position of the rotator is inferred through measuring a back electromotive force voltage in the coils of the stator, thereby detecting a zero cross point (ZCP).

A ZCP is detected by comparing a reference voltage with a back electromotive force voltage induced in a certain phase of the stator. If a ZCP is detected, an interrupt is generated and phase commutation occurs after 30 electrical degrees from detection of the ZCP.

In a conventional 4-pole, 6-slot, surface permanent magnet, concentrated winding type BLDC motor, there are two 15-degree intervals having no change of magnetic flux. At these intervals, the back electromotive force voltage is zero, causing uneven ZCP detection. Because of the uneven ZCP detection, uneven detection of rotator position occurs and phase commutation does not conform to rotator position. The uneven detection of rotator position and irregular phase commutation generate a phase current ripple. The phase current ripple can cause vibrations or an abnormal operation of the BLDC motor. Shutdown of the BLDC motor may ultimately occur. Thus, performance of the BLDC motor may be degraded.

SUMMARY OF THE INVENTION

Therefore, it is an aspect of the invention to provide a control method of a sensorless brushless direct current (BLDC) motor, wherein a reference voltage inputted to comparators is altered to set new reference points, and then zero cross points (ZCPs) are detected using the new reference points to avoid uneven detection of the ZCPs.

It is another aspect of the invention to provide a control method of a sensorless BLDC motor, wherein phase commutation times are corrected corresponding to ZCPs detected with respect to new reference points to reduce current ripple, stably controlling the sensorless BLDC motor.

Additional aspects and/or advantages of the invention will be set forth in part in the description which follows and, in part, will be obvious from the description, or may be learned by practice of the invention.

In accordance with the invention, the above and/or other aspects can be achieved by the provision of a control method of a sensorless concentrated winding brushless direct current (BLDC) motor, comprising: producing a new reference voltage by adding a preset certain value to a reference voltage or subtracting a preset certain value from a reference voltage to produce a new reference voltage, and detecting zero cross points with respect to the new reference voltage to control drive of the sensorless concentrated winding BLDC motor.

The preset certain value may be greater than zero and less than a value corresponding to the magnitude of a back electromotive force voltage.

The preset certain value may be added or subtracted by adjusting the resistance of resistors connected to a reference voltage receiving terminal of a comparator.

Preferably, the new reference voltage is used to detect a ZCP, and phase commutation is performed at a point given by adding a predetermined angle to 30 electrical degrees after detection of ZCP or by subtracting a predetermined angle from 30 electrical degrees after detection of the ZCP to control drive of the sensorless concentrated winding BLDC motor.

Preferably, if the new reference voltage is set by subtracting the preset certain value, the predetermined angle is added in an ascending period of a back electromotive force voltage and is subtracted in a descending period thereof.

Preferably, if the new reference voltage is set by adding the preset certain value, the predetermined angle is subtracted in an ascending period of a back electromotive force voltage and is added in a descending period thereof.

The predetermined angle may vary in value depending upon an angular speed of the sensorless concentrated winding BLDC motor.

Preferably, the phase commutation is performed after further correction by a current ripple reduction angle.

The current ripple reduction angle of 10° to 15° may be applied to correct the commutation time during a high-speed drive exceeding a preset speed.

Preferably, the sensorless concentrated winding BLDC motor is of a 4-pole 6-slot surface permanent magnet (SPM) type.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
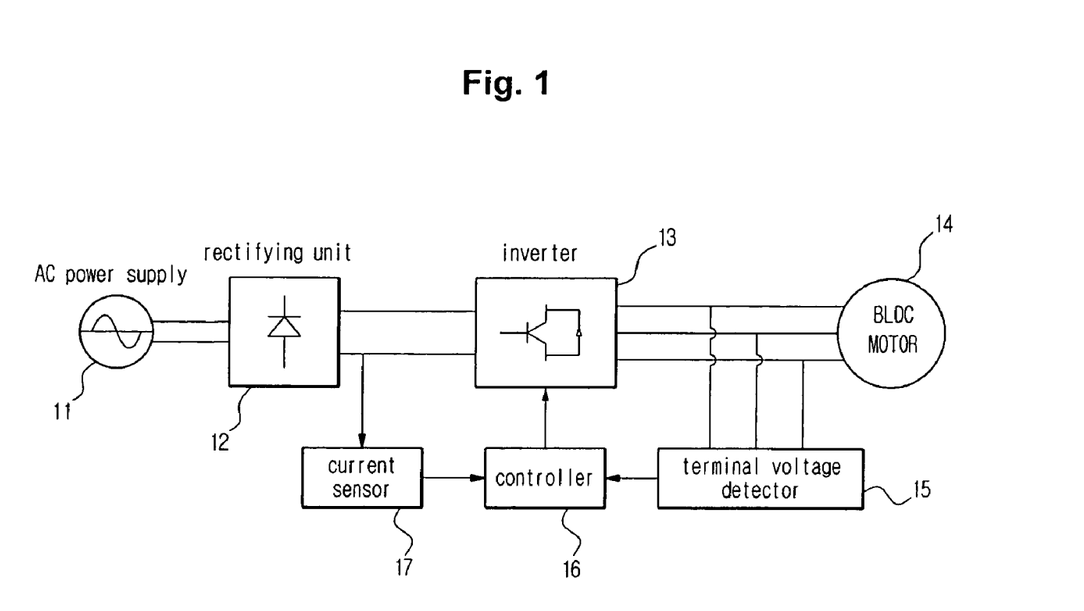
FIG. 1 is a block diagram showing a driving apparatus of a sensorless brushless direct current (BLDC) motor.

FIG. 1 is a simplified block diagram showing a driving apparatus of a sensorless brushless direct current (BLDC) motor. As shown in FIG. 1, the driving apparatus comprises a rectifying unit 12, an inverter 13, a BLDC motor 14, a terminal voltage detector 15, a controller 16, and a current sensor 17. The rectifying unit 12 receives alternating current (AC) power from an AC power supply 11. The rectifying unit 12 includes a rectifier to rectify AC power and a smoothing condenser to smooth the rectified AC power 11. The rectified and smoothed AC power provides the DC voltages inputted to the inverter 13. The inverter 13 includes transistors and diodes that are connected in an anti-parallel angle to the transistors. The transistors in response to a driving signal from the controller 16 switch on or off to control input DC voltages supplied to the BLDC motor 14. By controlling the switching of the transistors, the inverter 13 provides 3-phase power to the BLDC motor 14. The BLDC motor 14 includes a stator and a rotator. The stator of the BLDC motor receives 3-phase power converted by switching of the inverter 13 to produce a rotating magnetic field, and the rotator of the BLDC motor rotates due to an interaction with the rotating magnetic field of the stator. The terminal voltage detector 15 inputs a back electromotive force voltage generated in the stator of the BLDC motor 14, compares it with a reference voltage, detects a ZCP, extracts position information of the rotator, and sends the position information to the controller 16. The controller 16 calculates the speed of the BLDC motor 14 on the basis of the position information of the rotator and generates a pulse width modulation (PWM) pattern for speed control of the BLDC motor 14 using the calculated speed. The current sensor 17 detects a current flow to determine loads applied to the BLDC motor 14 and sends detected current data to the controller 16.

Figure 2:
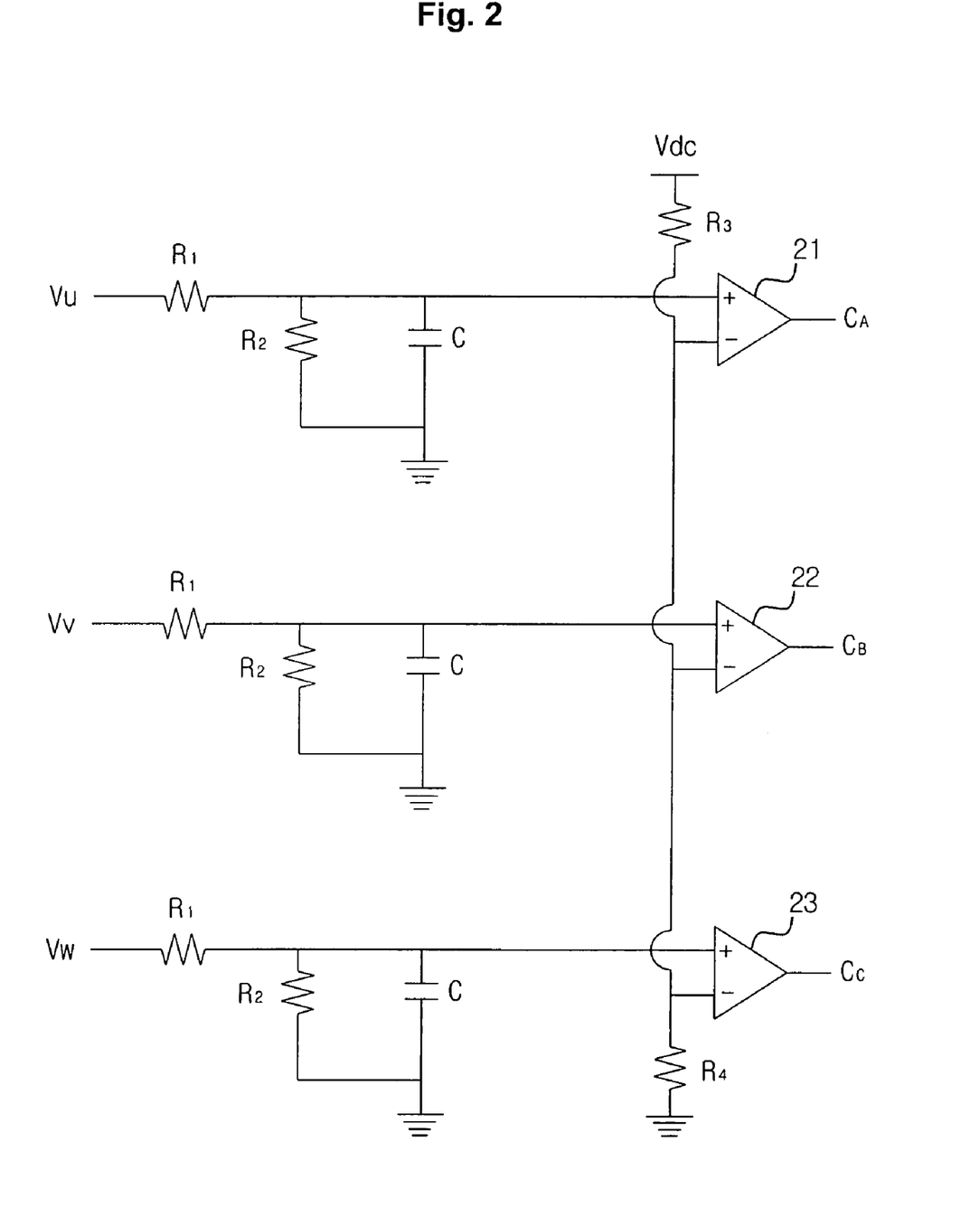
FIG. 2 is a circuit diagram showing a zero cross point (ZCP) detection circuit of the sensorless BLDC motor.

FIG. 2 shows a ZCP detection circuit to detect ZCPs of the sensorless BLDC motor. The ZCP detection circuit includes comparators 21, 22 and 23. Through respective inverting terminals, the comparators 21, 22 and 23 receive as a reference input a neutral point voltage Vdc of the sensorless BLDC motor across a resistor $R_3$. Through respective non-inverting terminals, the comparators 21, 22 and 23 receive 3-phase terminal voltages Vu, Vv and Vw each divided by resistors $R_1$ and $R_2$, respectively. Then, the comparators 21, 22 and 23 compare the respective divided 3-phase voltages Vu, Vv and Vw with the reference input. The comparators 21, 22 and 23 output comparison results, Ca, Cb and Cc, respectively, to the controller 16.

The operation of the driving apparatus of the sensorless BLDC motor having the above described configuration is described below.

AC input power is rectified and smoothed through the rectifying unit 12, and inputted to the inverter 13, which converts the inputted power into 3-phase voltages by turning on or off each transistor in response to a control signal from the controller 16. Then, based on the position of the rotator, the converted 3-phase voltages are applied to the stator to control the BLDC motor.

The terminal voltage detector 15 detects when back electromotive force voltage changes. Referring to FIG. 2, a neutral point voltage Vdc is inputted through the resistor $R_3$ to the inverting terminals of the respective comparators 21, 22 and 23. Back electromotive force voltages of different phases are divided by the resistors $R_1$ and $R_2$, and inputted to the non-inverting terminals of the respective comparators 21, 22 and 23, respectively. Then, the back electromotive force voltages are compared with the neutral point voltage Vdc, and corresponding comparison results are outputted as output voltages Ca, Cb and Cc, respectively.

At this time, a ZCP is detected when the polarity of the back electromotive force voltage changes from positive to negative or from negative to positive. In general, if a ZCP is detected, an interrupt is generated. Phase commutation is calculated using rotator position and sensed current value from the current sensor 17. And a PWM pattern is transmitted to the inverter 13, to control the BLDC motor 14.

In a conventional 4-pole, 6-slot, SPM type BLDC motor, there are two 15-degree intervals having no change of magnetic flux linkage on either side of a stator slot. At these intervals, the back electromotive force voltage is zero, causing uneven ZCP detection. Because of the uneven ZCP detection, uneven detection of rotator position occurs and phase commutation does not conform to rotator position. The uneven detection of rotator position and irregular phase commutation can cause vibrations or an abnormal operation of the BLDC motor. Shutdown of the BLDC motor may ultimately occur. Thus, performance of the BLDC motor may be degraded.

Figure 3:
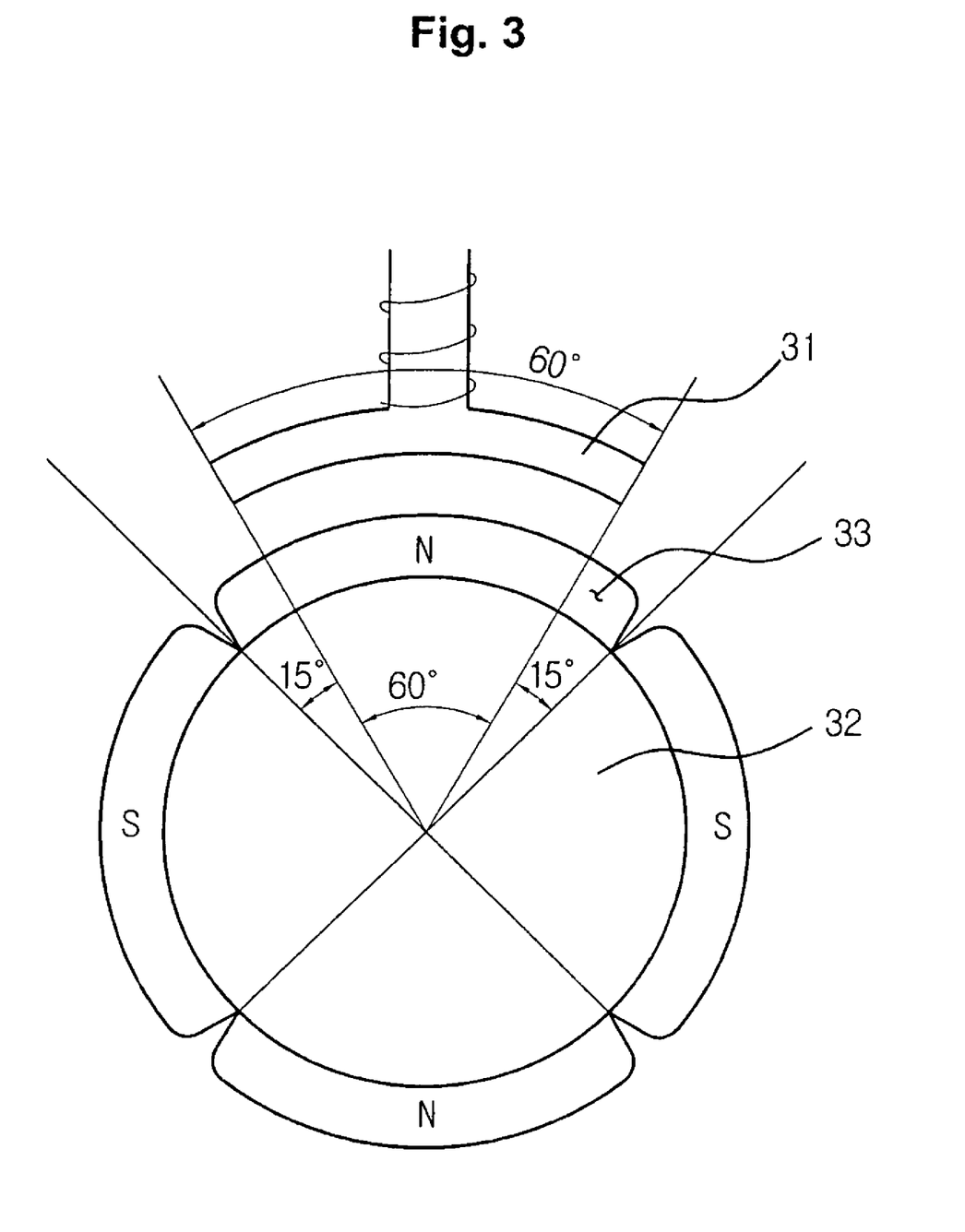
FIG. 3 is a diagram illustrating an interval in which there is no change in magnetic flux linkage of a BLDC motor of a 4-pole, 6-slot, surface permanent magnet (SPM), concentrated winding type.

FIG. 3 illustrates an interval in which there is no change in magnetic flux linkage of a BLDC motor having a 4-pole, 6-slot, surface permanent magnet (SPM), concentrated winding type. In the 4-pole, 6-slot, SPM, concentrated winding type BLDC motor, as opposed to a 24-slot distributed winding BLDC motor, a pole interval is 90° and a stator slot interval is 60°. A back electromotive force voltage induced from a phase winding of the stator 31 is caused by changes of the magnetic flux linkage. As shown in FIG. 3, in the 4-pole, 6-slot, SPM, concentrated winding type BLDC motor, there are two 15-degree intervals 33 having no change of the magnetic flux linkage with respect to the phase winding at the left and right of a stator slot interval, respectively. At these intervals, the back electromotive force voltage is zero.

Figure 4:
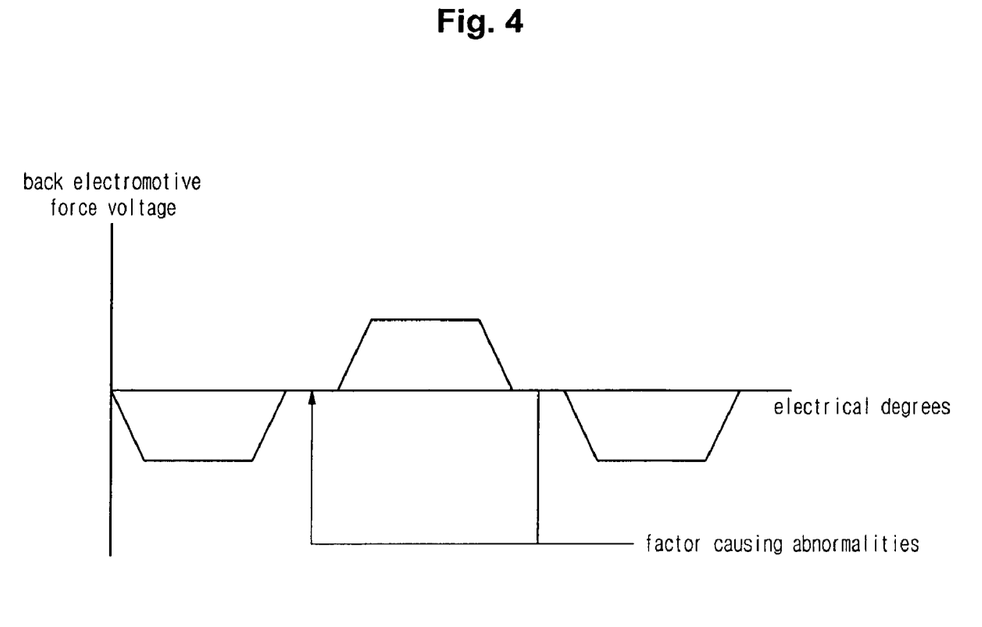
FIG. 4 is a diagram showing the waveform of a back electromotive force voltage of the 4-pole, 6-slot, SPM, concentrated winding type BLDC motor.

FIG. 4 shows the waveform of a back electromotive force voltage of the 4-pole 6-slot SPM concentrated winding type BLDC motor. As shown in FIG. 4, there exist intervals in which the back electromotive force voltage is zero. These intervals cause uneven detection of rotor positions and irregular phase commutation, generating phase current ripple. The phase current ripple can cause vibrations or an abnormal operation of the BLDC motor. Shutdown of the BLDC motor may ultimately occur. Thus, performance of the BLDC motor may be degraded.

Figure 5:
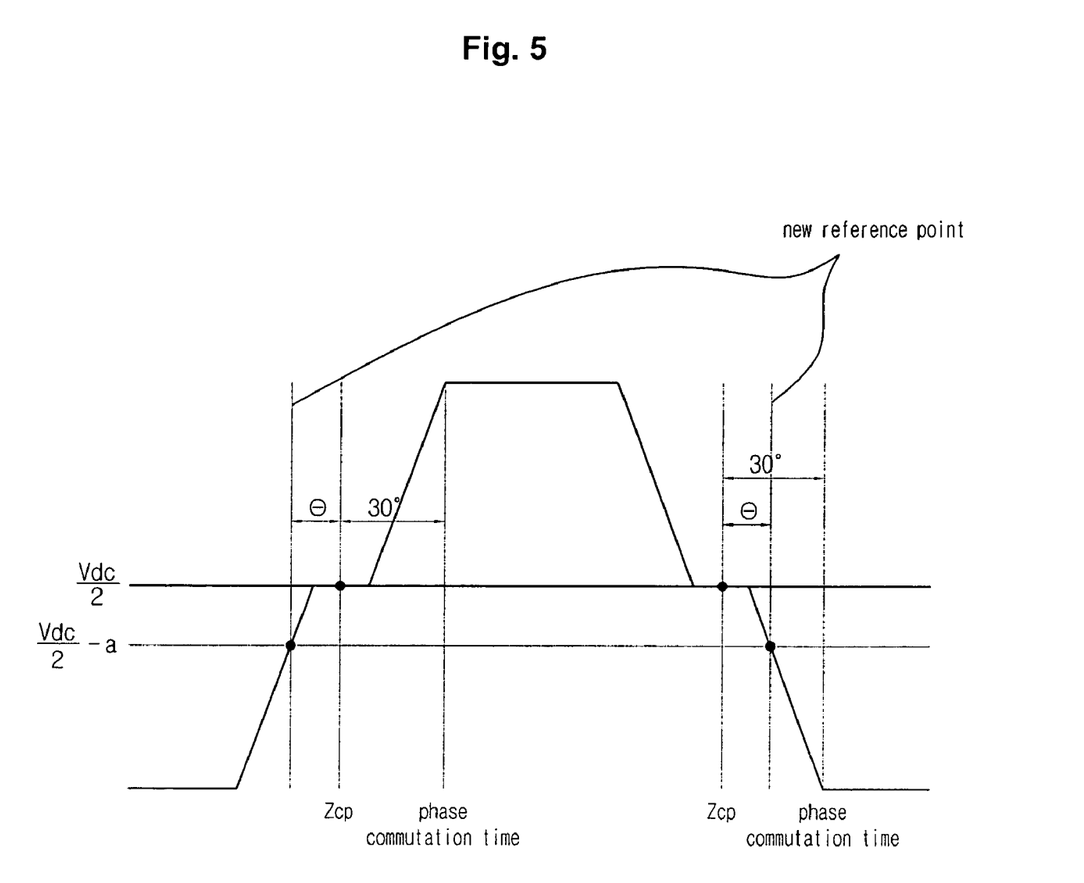
FIG. 5 is a diagram illustrating a ZCP detection method according to the present invention.

FIG. 5 is a diagram illustrating a ZCP detection method, for solving this uneven ZCP detection problem, according to the present invention. As shown in FIG. 5, a conventional reference voltage is ½Vdc, and the conventional reference voltage is subtracted by a certain value a to give a new reference voltage ½Vdc−a. As shown in FIG. 2, the reference voltage is divided by the resistors $R_3$ and $R_4$ and is then inputted to the inverting terminals of the respective comparators. The new reference voltage can be inputted to the comparators by adjusting the resistance values of the resistors $R_3$ and $R_4$. The new reference voltage is derived from $[(R_4)/(R_3+R_4)]$Vdc and inputted into the inverting terminals of each comparator. Hence, for example, to set the new reference voltage to 0.8 Vdc, resistor values of $R_3$ and $R_4$ are chosen so that $R_4=4R_3$. The certain value a can be any value greater than zero and less than a value corresponding to the magnitude of the back electromotive force voltage. The certain value a is used to detect a ZCP in a stable and uniform manner. Thus, the present invention avoids problems associated with an interval where the back electromotive force voltage is zero.

After a ZCP is detected using the new reference voltage, phase commutation occurs shortly thereafter. Typically, phase commutation occurs 30 electrical degrees after detection of a ZCP. In the present invention, a ZCP is detected using a new reference voltage. Thus, if phase commutation occurs similar to the conventional case as taught by the present art, the phase commutation does not conform to rotator position. It can be understood from FIG. 5 that there exists a difference of p electrical degrees between a ZCP detected using an original reference voltage ½Vdc and a corresponding ZCP detected using the new reference voltage ½Vdc−a. Consequently, a conventional phase commutation time must be corrected such that phase commutation occurs at 30+μ electrical degrees after detection of a ZCP in an ascending period of the back electromotive force voltage, and at 30−μ electrical degrees after detection of a ZCP in a descending period thereof. At this time, the value of μ varies depending upon the certain value a, which is added or subtracted to derive a new reference voltage, and current rotator speed in revolutions per minute or RPM. Hence, the value of μ is determined through experimentation after determining in advance what certain value a is added or subtracted to derive the new reference voltage.

In addition, different from the case of FIG. 5 where a certain value a is subtracted from the original reference voltage, another new reference voltage can be derived by adding the certain value a to the original reference voltage. Similar to the case of FIG. 5, there exists a difference of μ electrical degrees between a ZCP detected using an original reference voltage ½Vdc and a corresponding ZCP detected using the new reference voltage ½Vdc+a. But when a certain value a is added to the original reference voltage, unlike the case of FIG. 5, the conventional phase commutation time is corrected such that the phase commutation occurs at 30−μ electrical degrees after detection of a ZCP in an ascending period of the back electromotive force voltage, and at 30+μ electrical degrees after detection of a ZCP in a descending period thereof.

If phase current of a square waveform is applied to a typical BLDC motor whose back electromotive force voltage has a trapezoidal waveform, ripple-free torque is produced. For this reason, it would be good to use a current source inverter, but current source inverters are relatively expensive. Thus, a voltage source inverter is generally used, but voltage source inverters cannot provide the ideal phase current of a square waveform, thereby generating current ripple during phase commutation, particularly at high-speed range where the current ripple can become large. Thus, corrective action is needed to reduce the current ripple. To reduce the current ripple, an advance angle, a current ripple reduction angle, can be applied to the determination of when phase commutation occurs. The value of this current ripple reduction angle can be determined through experimentation. It can be understood from FIGS. 7A and 7B that, typically, in a high-speed operation range of greater than or equal to 3000 RPM, application of a current ripple reduction angle of approximately 10° to 15° significantly reduces the current ripple.

Figure 6A:
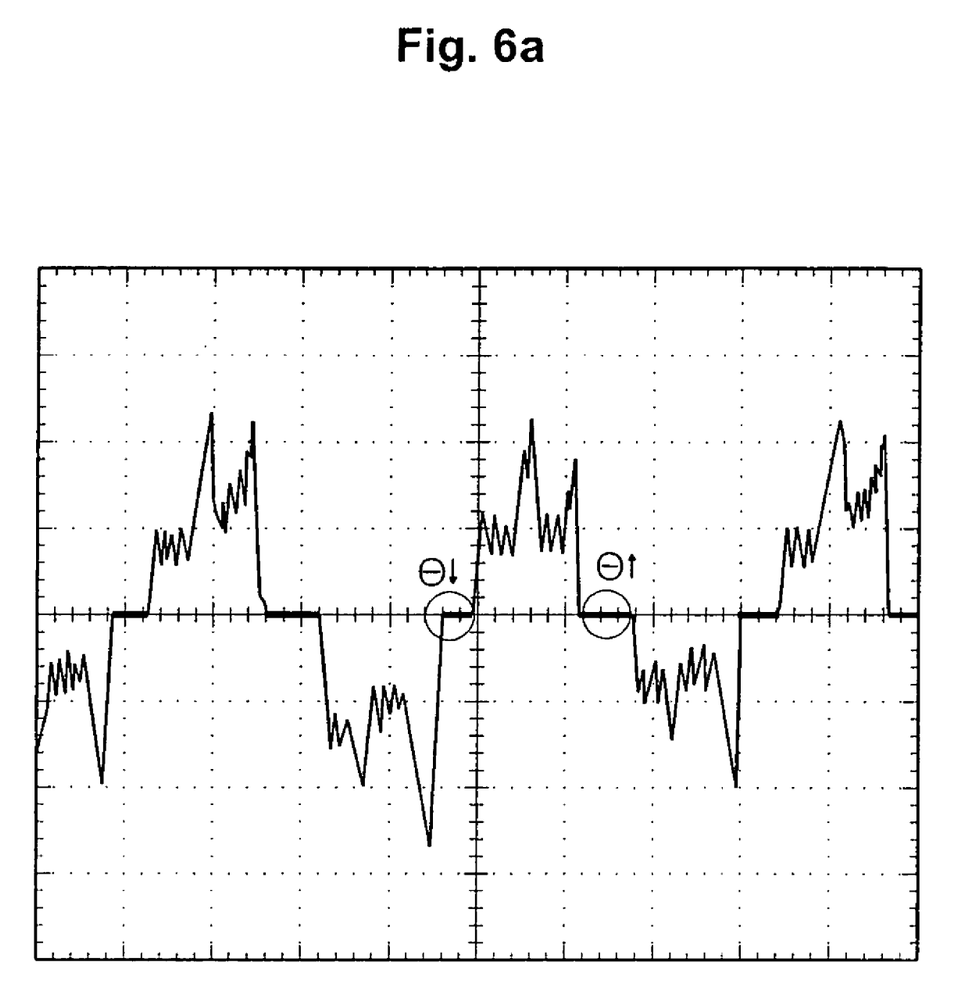
FIGS. 6A and 6B show waveforms of phase current before and after application of a correction angle, respectively, according to the present invention.
Figure 6B:
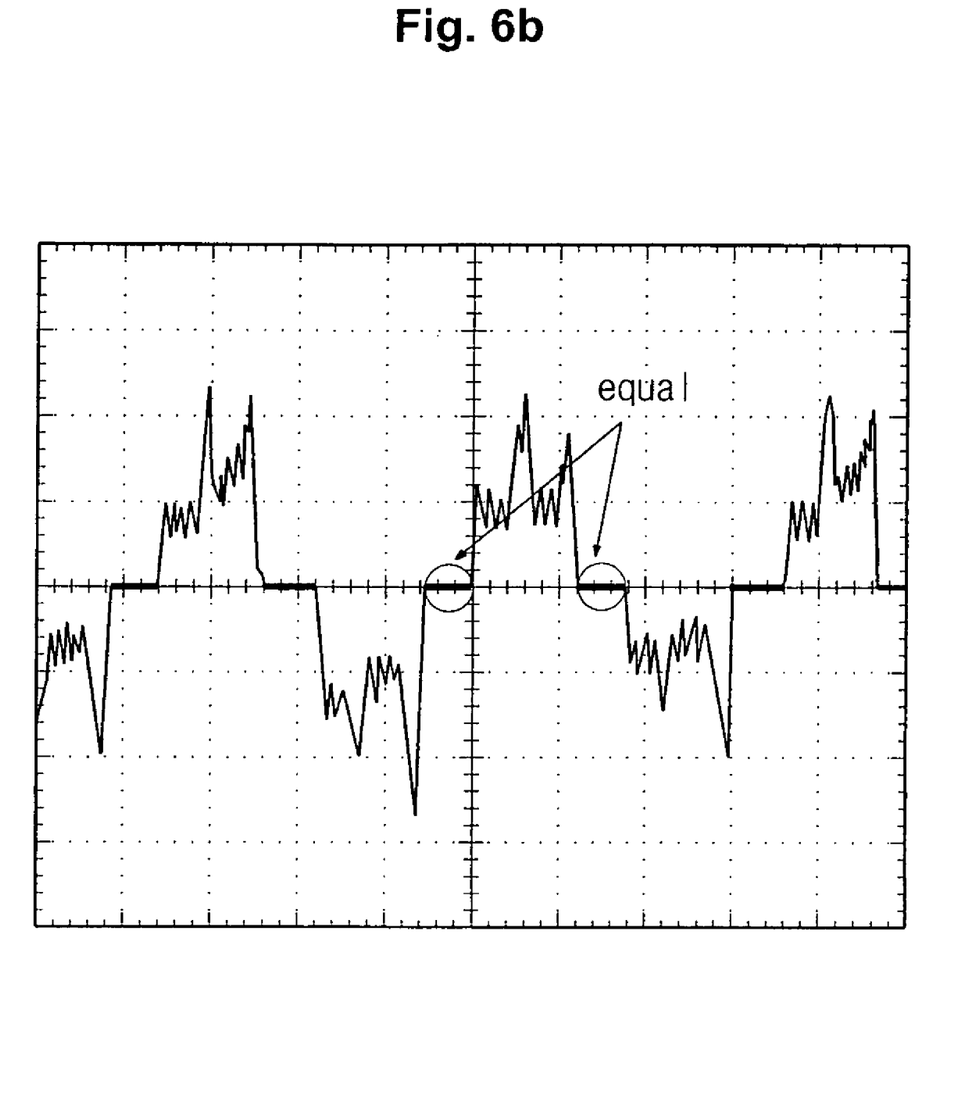

FIGS. 6A and 6B show waveforms of phase current before and after application of a correction angle according to the present invention, respectively. As shown in FIG. 6A, a conventional reference voltage is applied. When a back electromotive force voltage ascends (ascending period), a ZCP is detected earlier by p electrical degrees and the corresponding phase commutation occurs after 30 electrical degrees from detection of the ZCP. When the back electromotive force voltage descends (descending period), a ZCP is detected later by μ and corresponding phase commutation occurs after 30° from detection of the ZCP. Consequently, the phase commutation time is advanced by μ in an ascending period and is delayed by μ in a descending period, generating unequal phase commutation periods. In the present invention, as shown in FIG. 6B, a new reference voltage is applied to detect ZCPs and phase commutation is corrected by μ, equalizing phase commutation periods.

Figure 7A:
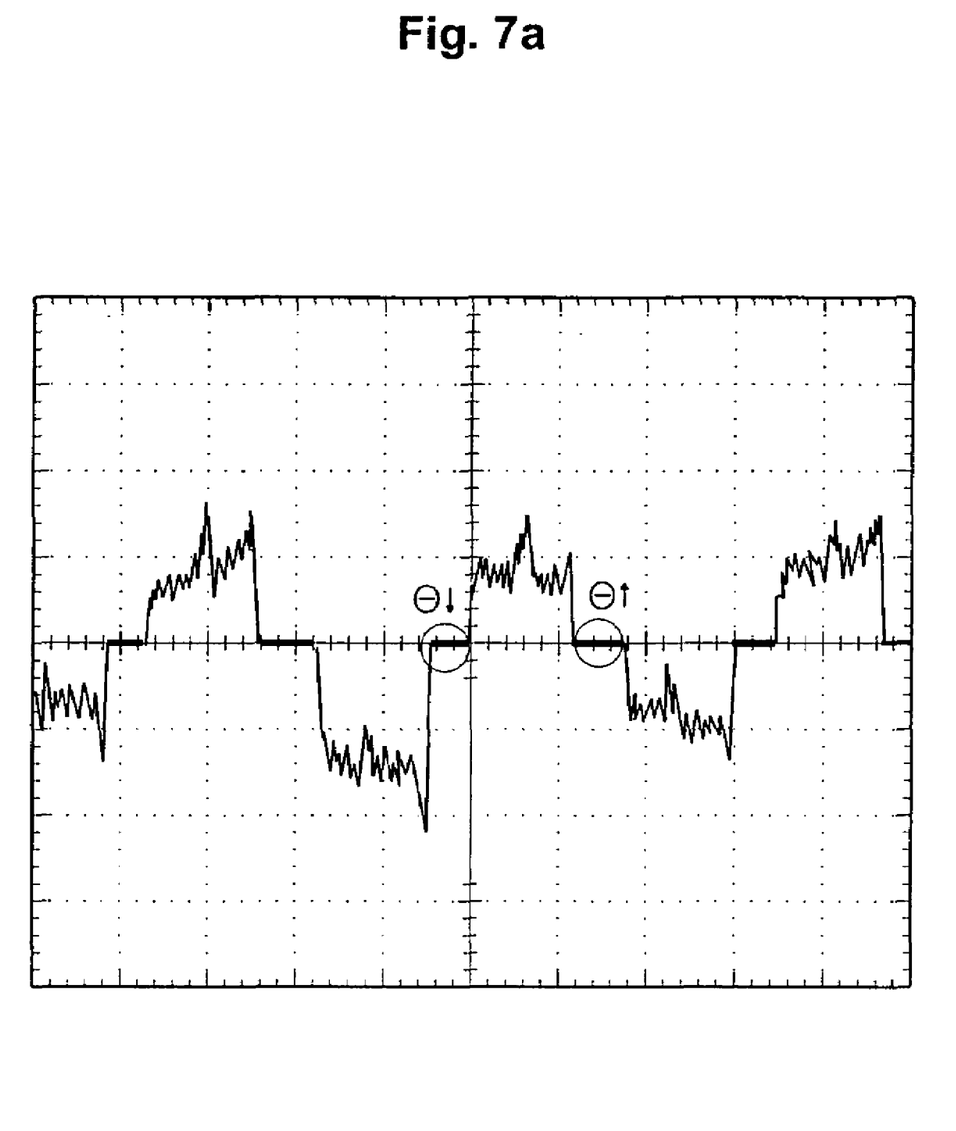
FIGS. 7A and 7B show waveforms of phase current before and after application, respectively, of the correction angle and a current ripple reduction angle (advance angle) according to the present invention.
Figure 7B:
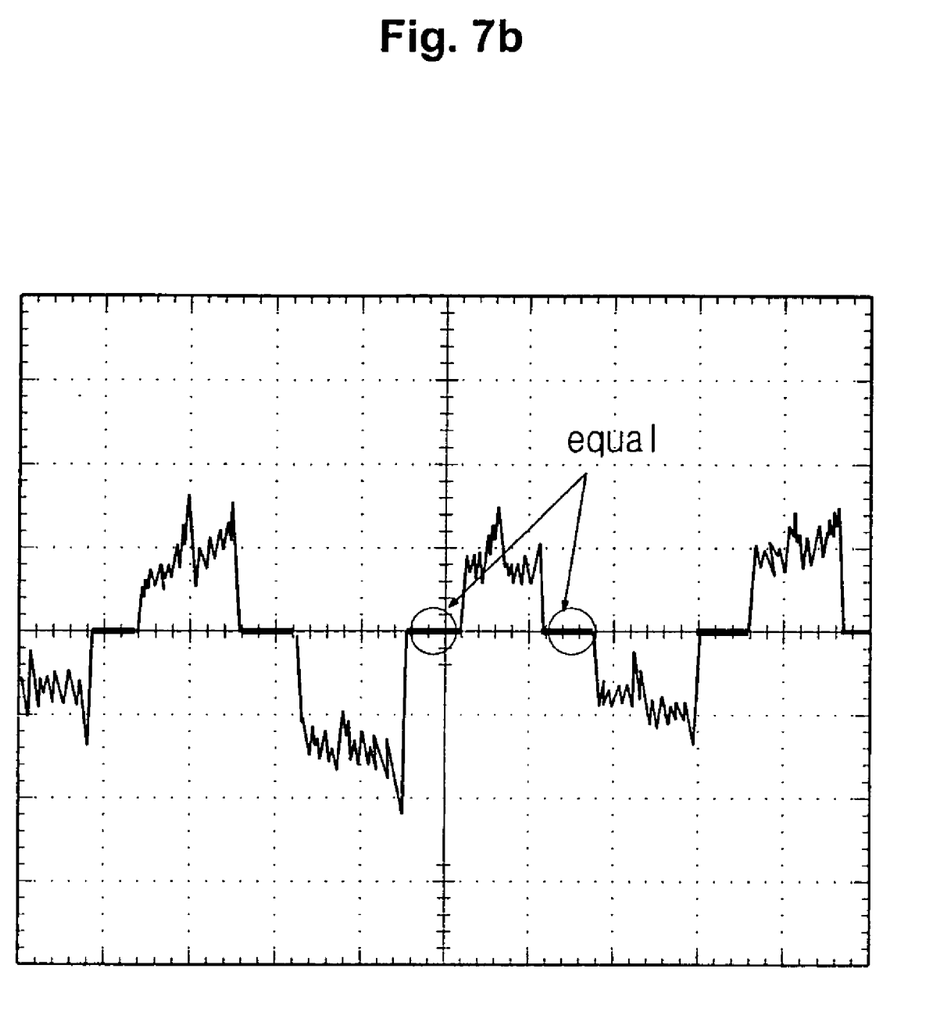

FIGS. 7A and 7B show waveforms of phase current before and after application, respectively, of a correction angle and a current ripple reduction angle to reduce current ripple according to the present invention. When a conventional reference voltage is applied and a current ripple reduction angle is applied to correct when phase commutation occurs, as shown in FIG. 7A, the current ripple is smaller than that of FIG. 6A, but phase commutation periods are still uneven. With the present invention, a new reference voltage is applied; phase commutation is corrected by μ; and then a current ripple reduction angle is applied. As shown in FIG. 7B, phase commutation periods are equalized and the current ripple is reduced.

As apparent from the above description, the present invention provides a control method of a sensorless concentrated winding BLDC motor, wherein a reference voltage for detection of ZCPs is altered to avoid uneven detection of ZCPs, and phase commutation times are corrected corresponding to ZCPs detected with respect to new reference points to equalize phase commutation periods, leading to stable control of the sensorless BLDC motor.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A control method of a sensorless concentrated winding brushless direct current motor, comprising:
   adding a preset certain value to a first reference voltage producing a second reference voltage;
   detecting a zero cross point with respect to the second reference voltage; and
   performing phase commutation at a point given by adding a predetermined angle to 30 electrical degrees after detection of the zero cross point or by subtracting the predetermined angle from 30 electrical degrees after detection of the zero cross point to control the drive of the sensorless concentrated winding motor.

2. The control method as set forth in claim 1, wherein the predetermined angle varies in value depending upon speed of the sensorless concentrated winding motor.

3. The control method as set forth in claim 1, wherein the predetermined angle is subtracted in an ascending period of a back electromotive force voltage and is added in a descending period thereof.

4. The control method as set forth in claim 1, wherein the phase commutation is performed after further correction by a current ripple reduction angle.

5. The control method as set forth in claim 4, wherein the current ripple reduction angle of 10° to 15° is applied to correct commutation during a high-speed drive exceeding a preset speed.

6. A control method of a sensorless concentrated winding brushless direct current motor, comprising:
   subtracting a preset certain value from a first reference voltage producing a second reference voltage;
   detecting a zero cross point with respect to the second reference voltage; and
   performing phase commutation at a point given by adding a predetermined angle to 30 electrical degrees after detection of the zero cross point or by subtracting the predetermined angle from 30 electrical degrees after detection of the zero cross point to control the drive of the sensorless concentrated winding motor.

7. The control method as set forth in claim 6, wherein the predetermined angle varies in value depending upon speed of the sensorless concentrated winding motor.

8. The control method as set forth in claim 6, wherein the predetermined angle is added in an ascending period of a back electromotive force voltage and is subtracted in a descending period thereof.

9. The control method as set forth in claim 6, wherein the phase commutation is performed after further correction by a current ripple reduction angle.

10. The control method as set forth in claim 9, wherein the current ripple reduction angle of 10° to 15° is applied to correct commutation during a high-speed drive exceeding a preset speed.

11. A control method for a sensorless, concentrated winding, brushless direct current motor, comprising:
    adding a predetermined value to a first reference voltage producing a second reference voltage;
    receiving a plurality of terminal voltages;
    filtering the terminal voltages; and
    detecting zero cross points of the filtered terminal voltages with respect to the second reference voltage to control the drive of the sensorless concentrated winding motor.

12. The control method as set forth in claim 11, wherein the step of filtering the terminal voltages comprises:
    for each of the terminal voltages, connecting a capacitor between the respective terminal voltage and ground.

* * * * *